United States Patent
Swanberg (10) Patent No.: US 7,296,133 B2
(45) Date of Patent: Nov. 13, 2007

(54) METHOD, APPARATUS, AND COMPUTER PROGRAM PRODUCT FOR DYNAMICALLY TUNING AMOUNT OF PHYSICAL PROCESSOR CAPACITY ALLOCATION IN SHARED PROCESSOR SYSTEMS

(75) Inventor: Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/965,105

(22) Filed: Oct. 14, 2004

(65) Prior Publication Data

US 2006/0101470 A1    May 11, 2006

(51) Int. Cl.
G06F 12/00        (2006.01)
(52) U.S. Cl. .................................... 711/173
(58) Field of Classification Search ............... 718/105, 718/104; 711/173
See application file for complete search history.

(56) References Cited

U.S. PATENT DOCUMENTS 5,774,718 A * 6/1998 Aoshima et al. ............ 718/100
6,438,671 B1 * 8/2002 Doing et al. ................ 711/173
2002/0087611 A1 * 7/2002 Tanaka et al. ................. 709/1
2004/0064817 A1 * 4/2004 Shibayama et al. ......... 718/104

* cited by examiner

Primary Examiner—Matthew Kim
Assistant Examiner—Sheng-Jen Tsai
(74) Attorney, Agent, or Firm—Duke W. Yee; Diana R. Gerhardt; Lisa L. B. Yociss (57) ABSTRACT

A method, apparatus, and computer program product in a shared processor data processing system are disclosed for dynamically tuning an amount of physical processor capacity that is allocated to each one of multiple logical partitions. A physical processor is shared among the logical partitions. A service window is allocated to each logical partition during each dispatch time slice. Processes that are defined by a first one of the logical partitions are executed during a first service window that was allocated to the first logical partition. A determination is made dynamically during runtime as to whether a length of the first service window should be increased to optimize interrupt processing and reduce interrupt latency.

If it is determined that the length should be increased, the length of the first service window is dynamically increased during runtime.

17 Claims, 6 Drawing Sheets

METHOD, APPARATUS, AND COMPUTER PROGRAM PRODUCT FOR DYNAMICALLY TUNING AMOUNT OF PHYSICAL PROCESSOR CAPACITY ALLOCATION IN SHARED PROCESSOR SYSTEMS

BACKGROUND OF THE INVENTION

1. Technical Field

The present invention is directed to data processing systems. More specifically, the present invention is directed to a method, apparatus, and computer program product for dynamically tuning the amount of the physical processor capacity that is allocated to each logical partition in a shared processor system to optimize interrupt processing and reduce interrupt latency.

2. Description of Related Art

A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor.

Known systems can include a shared processor where the shared processor is shared among the various processes that are being executed by the system. A shared processor may be part of a logically partitioned system and shared among the various partitions in the system. These systems typically include firmware, also called a hypervisor, that manages and enforces the partitioning and/or sharing of the processor. For example, a hypervisor may receive a request from the system to dispatch a virtual processor to a physical processor. The virtual processor includes a definition of the work to be done by a physical processor as well as various settings and state information that are required to be set within the physical processor in order for the physical processor to execute the work.

In known shared processor systems, the hypervisor supervises and manages the sharing of a physical processor among all of the logical partitions. The hypervisor has a dispatch time slice during which the hypervisor will service all of the logical partitions. The hypervisor services all of the logical partitions by granting time to each logical partition, during each dispatch time slice, during which the logical partition will be executed by the physical processor. Thus, during each dispatch time slice, each logical partition will have an opportunity to run on the physical processor.

The portion of the dispatch time slice that is allocated, or granted, to each logical partition represents the capacity of the physical processor that is granted to that logical partition. The portion of the dispatch time slice that is granted to a logical partition is referred to herein as that logical partition's "service window".

In known systems, the length of the dispatch time slice and the length of the service window are defined when a system administrator initially configures the system. They are typically not changed after being initially configured. The system administrator could change these values manually during runtime. However, it is not possible for the system administrator, when configuring the logical partitions, to know enough about what minimum amount of processor capacity is going to be required by a partition to efficiently service the interrupts of the devices assigned to that partition without encountering interrupt latency induced errors.

A problem can arise in a shared processor system when the length of the service window is not set to an optimal value. For example, interrupt latencies can cause some devices to encounter under-runs or overruns of adapter buffers. As described above, the virtual processors of a logical partition will be dispatched to the physical processor during that logical partition's service window. The physical processor will execute the virtual processors when those virtual processors are dispatched to the physical processor. It is only during this service window, when the logical partition's virtual processors are dispatched to the physical processor, that the logical partition will see interrupts that are intended for that logical partition. If an interrupt intended for a particular logical partition occurs at a time other than when that logical partition's virtual processors are being executed by the physical processor, a delay will occur before the interrupt can be processed. The processing of the interrupt is delayed until the virtual processors of the intended logical partition are once again dispatched to and be executed by the physical processor.

A device will generate an interrupt to a particular logical partition in order to notify the logical partition that the device either has received data that it needs to pass to the logical partition or that the device is expecting to receive data from the logical partition. If the logical partition does not respond in a timely manner to the device's interrupts, an overrun or under-run condition may occur in the device's buffer. Overruns and under-run conditions are latency-induced problems.

When a device receives data, the device generates an interrupt to the appropriate logical partition to alert the logical partition that the partition needs to read the data out of the device's buffer. If the logical partition does not respond to the interrupt and does not read the data out of the buffer, the data will remain in the buffer and the buffer will become full and will eventually be unable to hold any additional data. When the buffer is unable to hold additional data, additional data intended for storage in the buffer will be lost. This is an overrun condition.

When a device needs to receives data, the device generates an interrupt to the appropriate logical partition to alert the logical partition that the partition needs to write data to the device's buffer. If the logical partition does not respond to the interrupt and does not write data to the buffer, the buffer will remain at least partially empty even though the buffer should be storing data. This is an under-run condition.

Overruns and under-runs of device buffers can occur during the delay described above while the device waits for its interrupt to be processed. If the length of the service window is not optimally set for a logical partition during the configuration of the system, overruns and under-runs can affect the performance of the system.

In addition, although the length of the service window may have been set to an optimal value at one time, during runtime the requirements may change such that the length of the service window is no longer an optimal length of time. In this case, the system would have to be reconfigured by a system administrator in order to change the length of the service window. Such a modification to the length of the service window may still not solve the problem where the requirements in the system change dynamically during runtime.

Therefore, a need exists for a method, apparatus, and computer program product for dynamically tuning the amount of the physical processor capacity that is allocated to each logical partition in a shared processor system.

SUMMARY OF THE INVENTION

A method, apparatus, and computer program product in a shared processor data processing system are disclosed for dynamically tuning an amount of physical processor capacity that is allocated to each one of multiple logical partitions. A physical processor is shared among the logical partitions. A service window is allocated to each logical partition during each dispatch time slice. Processes that are defined by a first one of the logical partitions are executed during a first service window that was allocated to the first logical partition. A determination is made dynamically during runtime as to whether a length of the first service window should be increased. If it is determined that the length should be increased, the length of the first service window is dynamically increased during runtime.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product in a shared processor data processing system for dynamically tuning an amount of physical processor capacity that is allocated to each one of multiple logical partitions. The fraction of the physical processor that is allocated to each logical partition during each dispatch time slice is represented by the length of that logical partition's service window.

According to the present invention, a device will maintain status bits or a status buffer in which will be included information about errors or problems that occur in the device. When the device experiences an overrun or under-run condition, the device will log information about that condition in its status bits/buffer. The information will also include a severity level that is assigned to the problem. This information can then be polled at a later time.

The following kernel service allows a kernel extension to report an error encountered due to high latency in its ability to field and process timer and/or external interrupts. This might be in response to data buffer overruns or under-runs due to insufficient CPU bandwidth to process device queues. This service will log the error, and depending on the reported priority, will threshold the latency error reports and make decisions as to when to make capacity changes. This service will attempt to request an increase in the partition's entitled capacity.

The following is the API definition that device drivers use to report the condition to the kernel.

void klatency_error(char *name, int severity);

where:

| Parameter: | Description: |
|---|---|
| name: | a character string name sufficient to identify the device instance. |
| severity: | an enumerate value defining the severity of the error, such as<br>HIGH = unrecoverable failures<br>MEDIUM = recoverable, but performance and/or functionally impairing, and<br>LOW = intermittent, recoverable. |

The device driver determines the severity to report. For example, if the errors it is detecting represent data loss, then it would report a severity of HIGH. If the errors are high frequency, but recovered after retransmission/retries, they would be reported as MEDIUM. If the errors are only occasional and/or intermittent and recovered, they would be reported as LOW.

The present invention describes modifying a device driver interrupt handler such that the handler will read a device's status bits/buffer when the interrupt handler receives an interrupt to process. In this manner, the interrupt handler will obtain information about the condition that occurred in the device.

The interrupt handler will then notify another process, referred to herein as a kernel latency notification process that is responsible for determining whether additional physical processor capacity should be requested. Each partition's kernel is executing its own kernel latency notification process. The kernel latency notification process for a partition maintains statistics for its logical partition. A logical partition's statistics indicate the number of latency-induced problems that have occurred as well as the severity of each problem.

The kernel is notified by any device driver that detected a latency condition and is notified as to the severity of that condition. The kernel then decides what action to take regarding requests to the hypervisor. For example, for LOW severity errors, the kernel may add them to threshold statistics and only request additional capacity after receiving some number of these notifications over a specified time interval. For HIGH severity errors, the kernel will make the request immediately.

The kernel latency notification process also maintains a threshold. If the current statistics exceed the threshold, the kernel latency notification process will make a request to the hypervisor for additional physical processor capacity for this logical partition.

The hypervisor receives and processes requests for additional physical processor capacity. At the time the system is configured, an upper limit is specified for the service window for each logical partition. This upper limit is defined by the system administrator as the maximum length of time for a service window for each logical partition. When the hypervisor receives a request for additional physical processor capacity, the hypervisor will determine whether this upper limit has been reached. The hypervisor will continue to grant requests for additional physical processor capacity by increasing the service window for a logical partition until the specified maximum length of time is reached. For example, in response to a first request, the hypervisor may grant the request by lengthening the service window a particular amount where the lengthened window still does not equal the maximum length. In response to a second request, the hypervisor may again grant the request by lengthening the service window a second amount where the second lengthened window also does not equal the maximum length.

The present invention is a self-tuning process. The kernel latency notification process will continue to request additional physical processor capacity until either the threshold is no longer exceeded or the specified maximum length for the service window has been reached. Therefore, a system administrator can configure a partition with the absolute minimum amount of physical processor capacity, and allow the partition to autonomically tune itself based on interrupt latency demands of devices operating within the partition.

Figure 1:
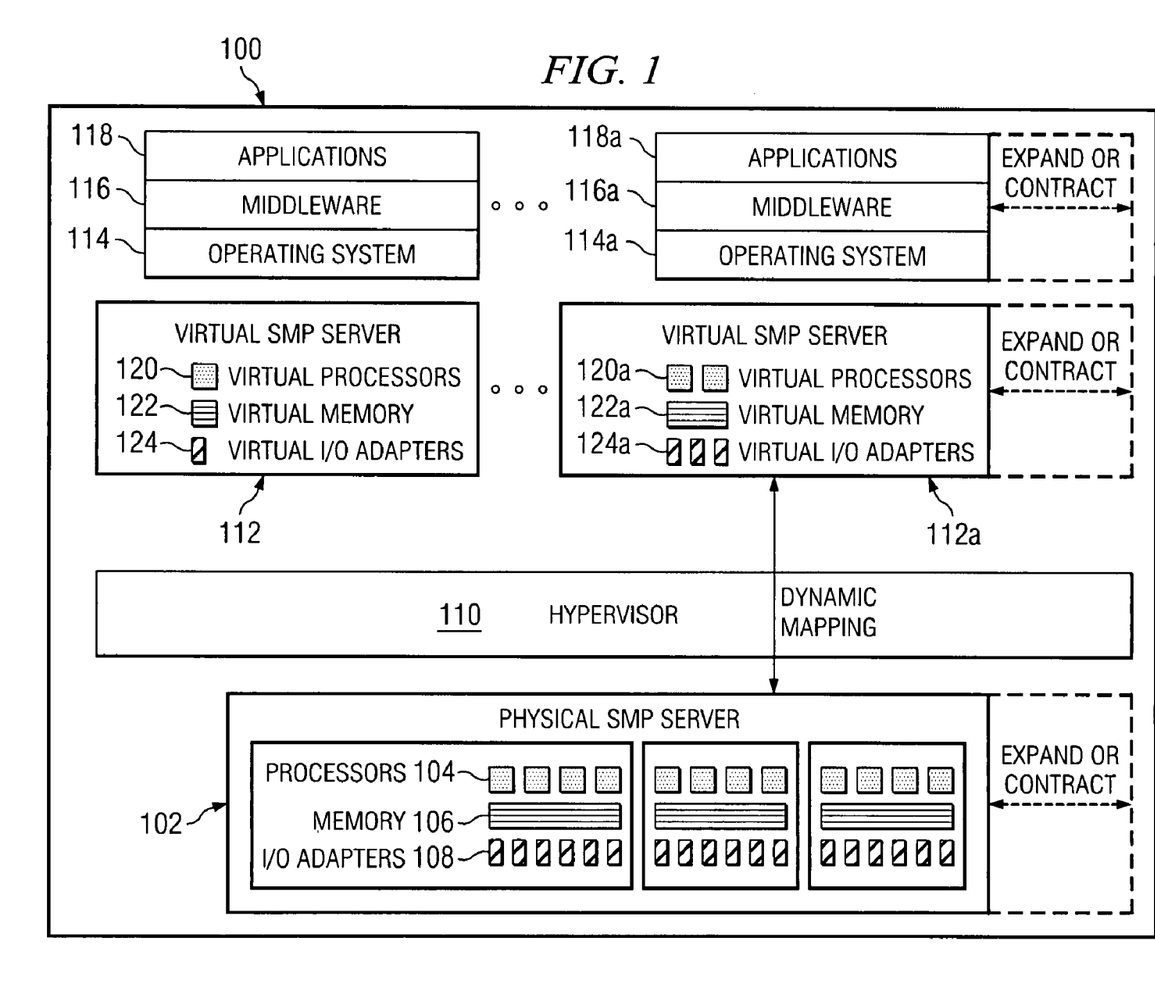
FIG. 1 is a block diagram of a data processing system in which the present invention may be implemented.

FIG. 1 is a block diagram of a data processing system 100, including a hypervisor, in which the present invention may be implemented. System 100 is preferably a symmetric multiprocessing (SMP) server computer system. SMP server computer system 100 includes physical hardware devices that can be mapped to, i.e. temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110. Each one of the processors 104 is preferably a shared processor and may be an SMT-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
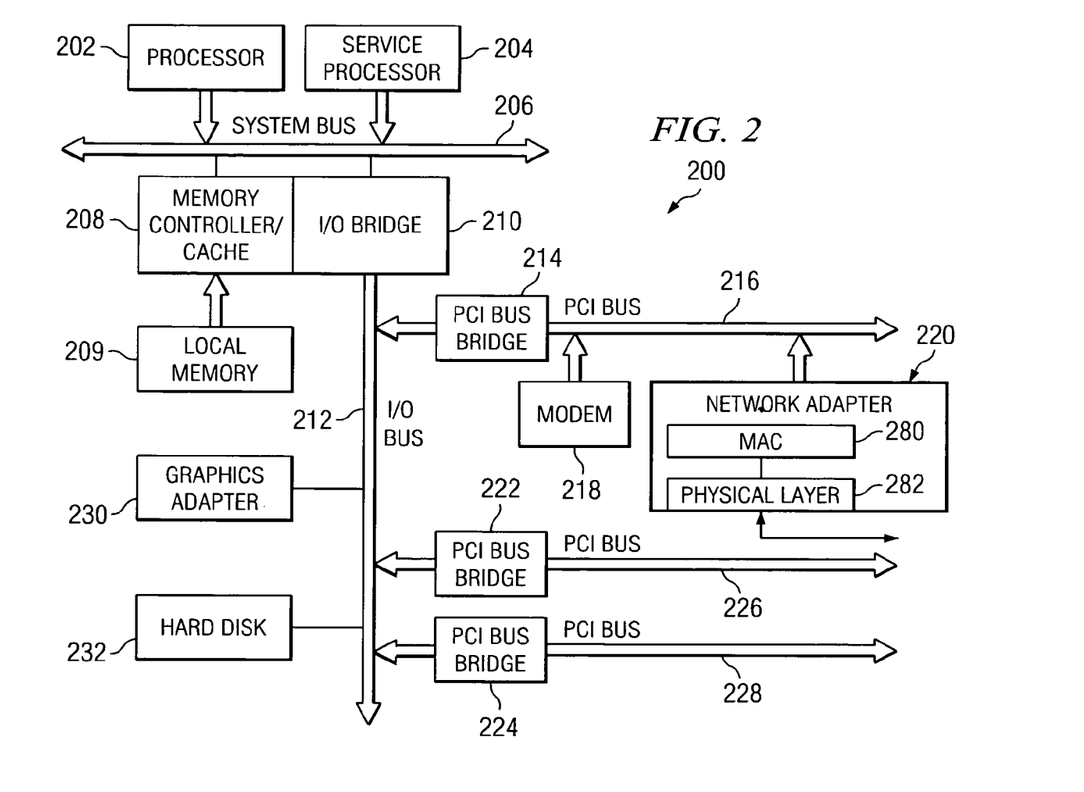
FIG. 2 is a more detailed illustration of a computer system that may be used to implement any of the computer systems described herein in which the present invention may be implemented in accordance with the present invention.

FIG. 2 is a more detailed illustration of a computer system that may be used to implement any of the computer systems described herein in which the present invention may be implemented in accordance with the present invention. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate an inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

Figure 3:
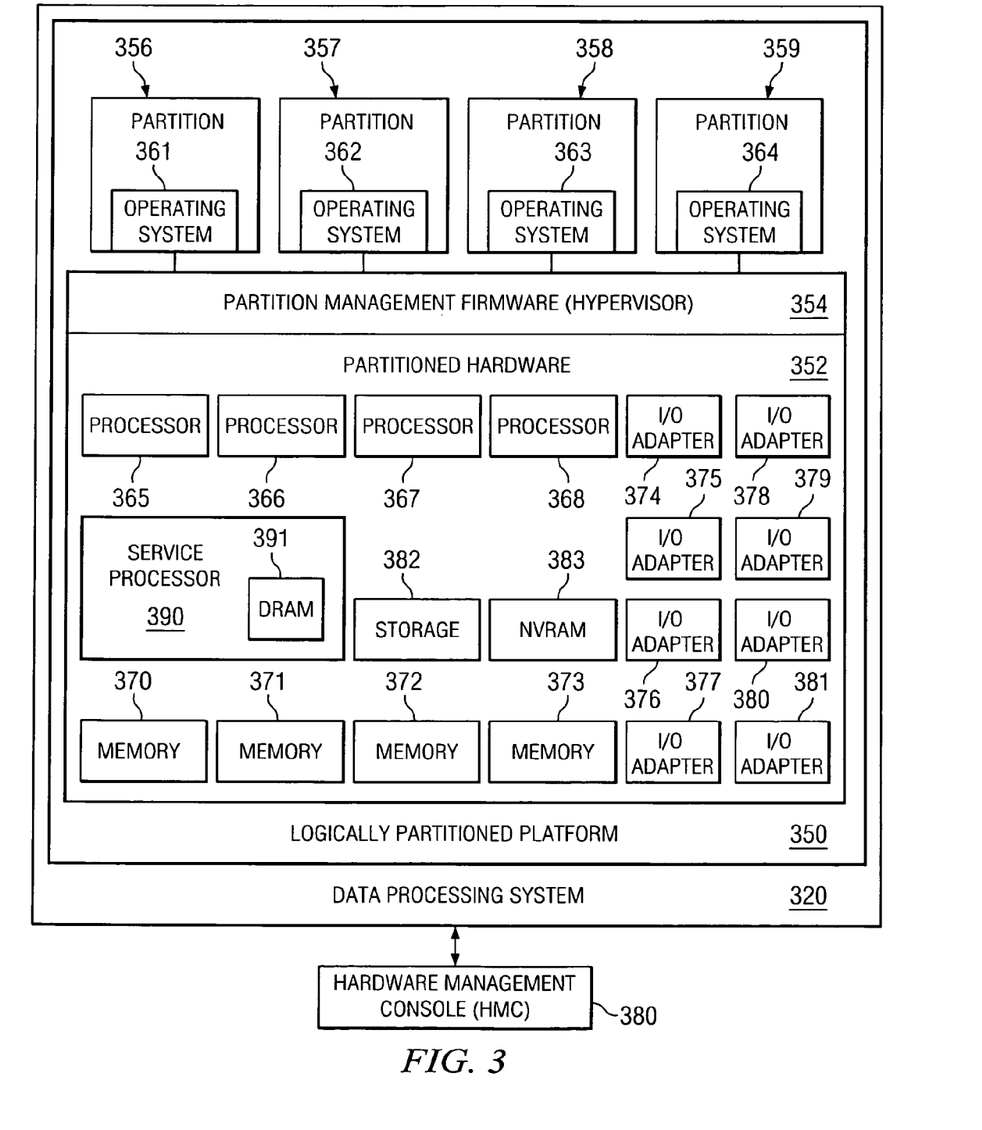
FIG. 3 is a block diagram of a logically partitioned platform that includes the present invention in accordance with the present invention.

FIG. 3 is a block diagram of a logically partitioned platform that includes the present invention. Data processing system 320 includes logically partitioned platform 350.

Platform 350 includes partitioned hardware 352, partition management firmware also called a hypervisor 354, and partitions 356-359. Operating systems 361-364 exist within partitions 356-359. Operating systems 361-364 may be multiple copies of a single operating system or multiple heterogeneous operating systems simultaneously run on platform 350.

Partitioned hardware 352 includes a plurality of shared or SMT-capable processors 365-368, a plurality of system memory units 370-373, a plurality of input/output (I/O) adapters 374-381, and a storage unit 382. Each of the processors 365-368, memory units 370-373, NVRAM storage 383, and I/O adapters 374-381 may be assigned to one of multiple partitions 356-359. Partitioned hardware 352 also includes service processor 390. A non-volatile memory device 391, such as an NVRAM device, is included within service processor 390.

Partition management firmware (hypervisor) 354 performs a number of functions and services for partitions 356-359 to create and enforce the partitioning of logically partitioned platform 350. Hypervisor 354 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 354 allows the simultaneous execution of independent OS images 361-364 by virtualizing all the hardware resources of logically partitioned platform 250. Hypervisor 354 may attach I/O devices through I/O adapters 374-381 to single virtual machines in an exclusive mode for use by one of OS images 361-364.

A hardware management console (HMC) 380 may be coupled to service processor 390 in data processing system 320. HMC 380 is a separate computer system that is coupled to service processor 390 and may be used by a user to control various functions of system 320 through service processor 390.

Figure 4:
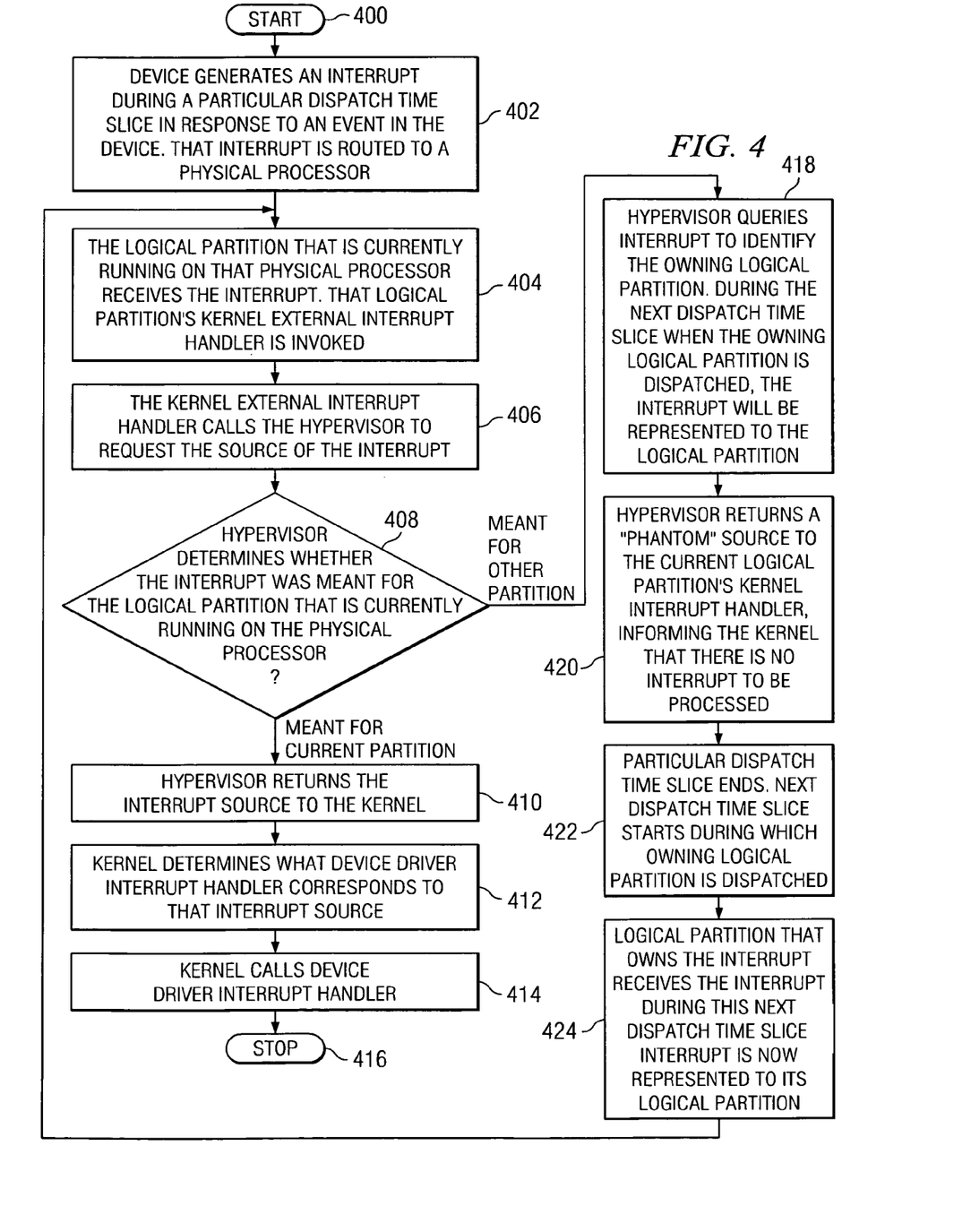
FIG. 4 depicts a high level flow chart that illustrates waiting until a logical partition is dispatched to a physical processor before the partition receives an interrupt from a device driver in accordance with the present invention.

FIG. 4 depicts a high level flow chart that illustrates waiting until a logical partition is dispatched to a physical processor before the partition receives an interrupt from a device driver in accordance with the present invention. The process starts as depicted by block 400 and thereafter passes to block 402 which illustrates a device generating an interrupt during a particular dispatch time slice in response to an event in the device. That interrupt is routed to a physical processor. Next, block 404 depicts the logical partition that is currently running on that physical processor receiving the interrupt. That logical partition's kernel external interrupt handler is invoked. The process then passes to block 406 which illustrates the kernel external interrupt handler calling the hypervisor to request the source of the interrupt.

Block 408, then, depicts a determination by the hypervisor of whether the interrupt was meant for the logical partition that is currently running on the physical processor or whether it was meant for another partition. If a determination is made that the interrupt is meant for the logical partition that is currently running on the physical processor, the process passes to block 410. Block 410 illustrates the hypervisor returning the interrupt source to the kernel. Thereafter, block 412 depicts the kernel determining what device driver interrupt handler corresponds to that interrupt source. Next, block 414 illustrates the kernel calling that device driver interrupt handler. The process then terminates as depicted by block 416.

Referring again to block 408, if a determination is made by the hypervisor that the interrupt is meant for a logical partition that is not currently running on the physical processor, the process passes to block 418. The hypervisor knows by the interrupt source for which logical partition the interrupt is intended. Thus, block 418 illustrates the hypervisor queuing the interrupt for the owning partition. During the next dispatch time slice when the owning logical partition is dispatched to the physical processor, the interrupt will be represented to that owning logical partition. Next, block 420 depicts the hypervisor returning a "phantom" source to the current logical partition's kernel interrupt handler which informs the kernel that there is no interrupt to be processed.

The process then passes to block 422 which illustrates ending this particular dispatch time slice, starting the next dispatch time slice, and then dispatching the owning logical partition to the physical processor. Block 424, then, depicts the logical partition that owns the interrupt receiving the interrupt during this next dispatch time slice. The interrupt is now represented to the logical partition. The process then passes back to block 404.

Figure 5:
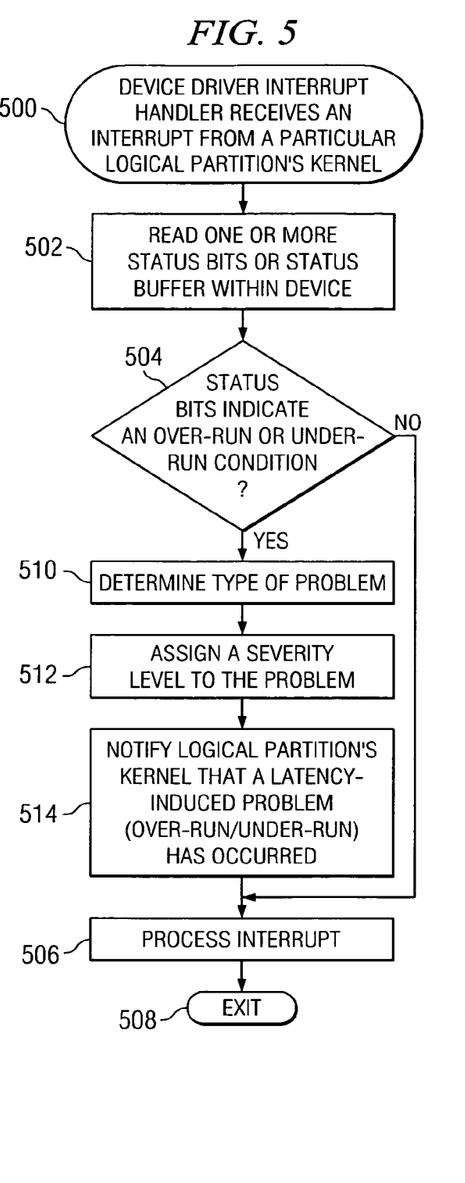
FIG. 5 illustrates a high level flow chart that depicts a device driver interrupt handler processing an interrupt in accordance with the present invention.

FIG. 5 illustrates a high level flow chart that depicts a device driver interrupt handler processing an interrupt in accordance with the present invention. The process starts as depicted by block 500 when a particular device driver interrupt handler receives an interrupt from a particular logical partition's operating system kernel. Next, block 502 illustrates the interrupt handler reading one or more status bits or a status buffer within the device. Thereafter, block 504 depicts a determination of whether or not the status bits or buffer indicate an overrun or under-run condition. If the status bits or buffer do not indicate either an overrun or an under-run condition, the process exits as illustrated by block 508.

Referring again to block 504, if a determination is made that the status bits or buffer do indicate either an overrun or an under-run condition, the process passes to block 510 which illustrates determining the type of problem using the information in the status bits or buffer. Next, block 512 depicts assigning a severity level to this type of problem. The device driver evaluates the error and assigns a severity level to it as described above. Thereafter, block 514 illustrates notifying a logical partition's kernel that a latency-induced problem has occurred. Overrun and under-run conditions are latency-induced problems. The process then passes back to block 506.

Figure 6:
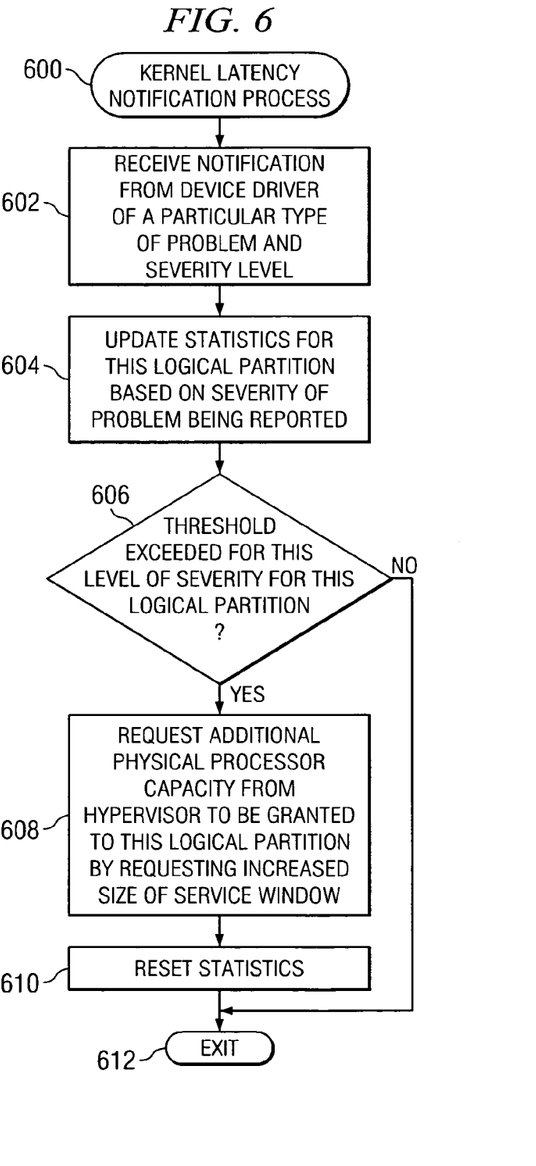
FIG. 6 depicts a high level flow chart that illustrates a kernel notification process that determines for each logical partition whether additional physical processing capacity should be requested and makes the requests for additional capacity in accordance with the present invention.

FIG. 6 depicts a high level flow chart that illustrates a kernel notification process that determines for each logical partition whether additional physical processing capacity should be requested and makes the requests for additional capacity in accordance with the present invention. The process starts as depicted by block 600 and thereafter passes to block 602 which illustrates receiving a notification from a device driver of a particular type of problem and severity level. Next, block 604 depicts updating statistics that are kept by the kernel notification process for this logical partition. The statistics are updated based on the severity of the problem being reported. Any method may be used for keeping track of error. Preferably, however, statistics are kept separately by the kernel notification process for each type of error, e.g. HIGH, MEDIUM, and LOW, that indicate the number of occurrences of each type of error.

Each logical partition includes its own kernel notification process. Thus, the kernel notification process for a particular logical partition will track the total number of each severity level of latency-induced errors that occurred in an I/O device due to an interrupt for that particular logical partition. In addition, the kernel notification process will maintain a separate threshold for its particular logical partition for each severity level of error.

The process then passes to block 606 which illustrates a determination of whether or not a threshold that was set for this logical partition has been exceeded for problems having this level of severity. Preferably, a threshold is set for HIGH levels of errors, a different threshold is set for MEDIUM levels of errors, and a third threshold is set for LOW levels of errors.

If a determination is made that the threshold for this particular type of error has not been exceeded, the process terminates as depicted by block 612. Referring again to block 606, if a determination is made that the threshold for this particular type error has been exceeded, the process passes to block 608 which depicts the kernel latency notification process requesting, from the hypervisor, that additional physical processor capacity be granted to this logical partition by requesting an increased length of the logical partition's service window. Block 610, then, illustrates resetting the all of statistics for this logical partition. The process then terminates as illustrated by block 612.

Figure 7:
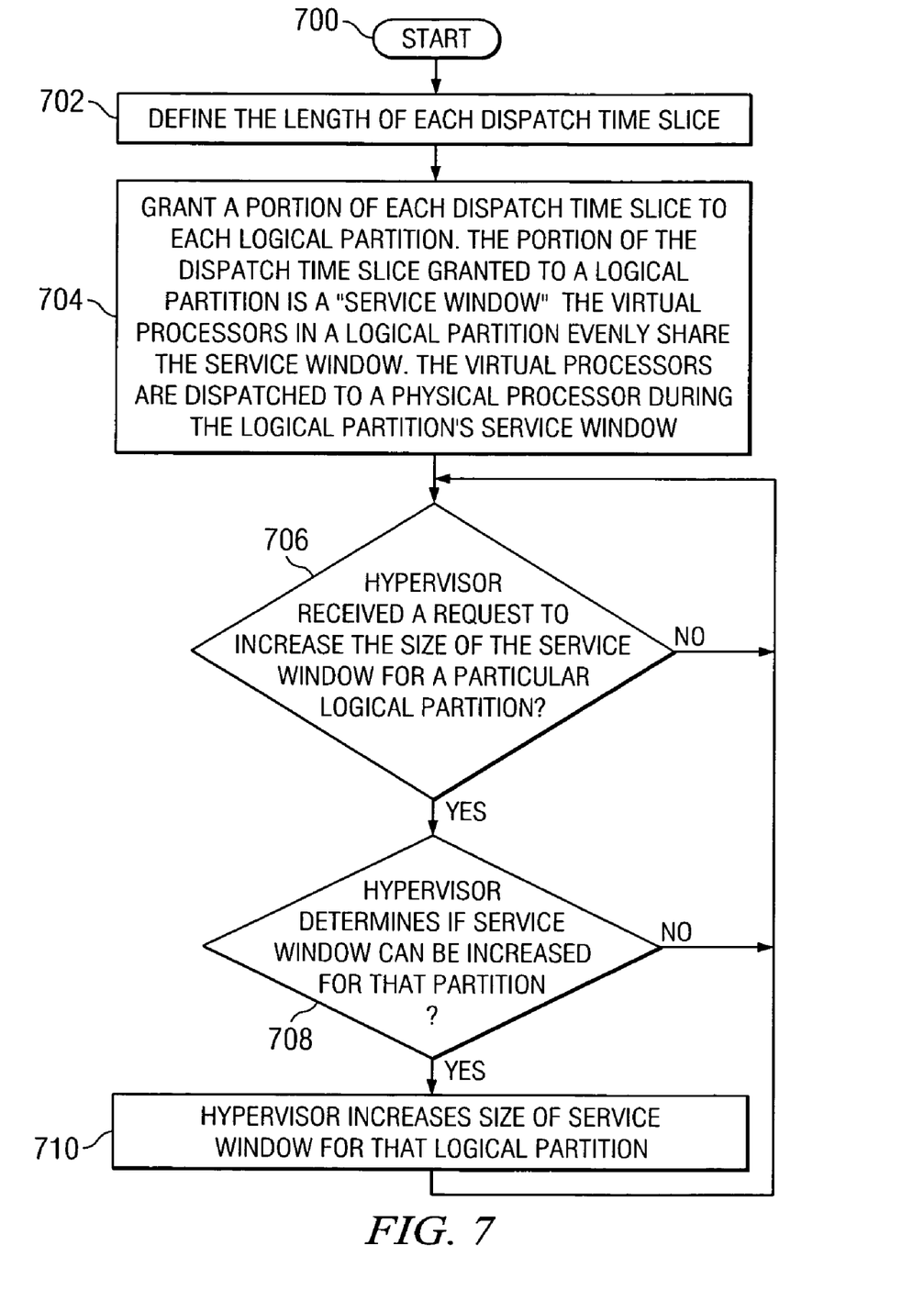
FIG. 7 illustrates a high level flow chart that depicts hypervisor firmware granting additional physical processing capacity in accordance with the present invention.

FIG. 7 illustrates a high level flow chart that depicts hypervisor firmware granting additional physical processing capacity in accordance with the present invention. The process starts as depicted by block 700 and thereafter passes to block 702 which illustrates defining the length of a dispatch time slice. The hypervisor has a dispatch "wheel" time quantum, referred to herein as a "dispatch time slice" that is a predefined period of time during which the hypervisor will service all virtual processors of each logical partition.

Next, block 704 depicts granting a portion of each dispatch time slice to each logical partition. The portion of the dispatch time slice that is granted to a logical partition is referred to herein as that logical partition's "service window". The hypervisor services all of the virtual processors that are defined within a particular logical partition during that partition's service window. The service window is the length of time that a physical processor is available to execute the logical partition's virtual processors. Thus, each virtual processor is granted a portion of the logical partition's service window in which to run on the physical processor. The virtual processors in a logical partition evenly share that logical partition's service window. The virtual processors are dispatched to a physical processor during the logical partition's service window. The size of a logical partition's service window represents the capacity of a physical processor that has been granted to that logical partition.

Block 706, then, depicts a determination of whether or not the hypervisor has received a request to increase the size of the service window for a particular logical partition. If a determination is made that the hypervisor has not received a request to increase the size of the service window for a particular logical partition, the process passes back to block 706. If a determination is made that the hypervisor has received a request to increase the size of the service window for a particular logical partition, the process passes to block 708 which illustrates a determination by the hypervisor of whether or not the service window for that particular logical partition can be increased. If a determination is made that the service window for that particular logical partition can not be increased, the process passes back to block 706.

Referring again to block 708, if a determination is made that the service window for that particular logical partition can be increased, the process passes to block 710 which depicts the hypervisor increasing the size of the service window for that logical partition. The logical partition is therefore granted additional physical processor capacity because the logical partition's virtual processors will be executed for a longer period of time by the physical processor. The process then passes back to block 706.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a shared processor data processing system for dynamically tuning an amount of physical processor capacity that is allocated to each one of a plurality of logical partitions to optimize interrupt processing and reduce interrupt latency, said method comprising:
    sharing a physical processor among said plurality of logical partitions;
    allocating a service window to each one of said logical partitions during each dispatch time slice;
    executing, by said physical processor, processes defined by a first one of said plurality of logical partitions during a first service window that was allocated to said first one of said plurality of logical partitions;
    dynamically determining during runtime whether a length of said first service window should be increased;
    in response to determining that said length should be increased, dynamically increasing said length of said first service window during runtime to optimize interrupt processing and reduce interrupt latency, said first one of said plurality of logical partitions being granted additional processing capacity of said physical processor;
    said step of dynamically determining during runtime whether said length of said first service window should be increased further includes:
    generating, by an input/output (I/O) device, an interrupt for said first one of said plurality of logical partitions;
    analyzing said I/O device to determine whether a latency-induced error has occurred in said I/O device;
    in response to determining that a latency-induced error has occurred in said I/O device, assigning a severity level to said error; and
    notifying a kernel process that said latency-induced error occurred and including said severity level in said notification.

2. The method according to claim 1, further comprising:
    managing sharing, utilizing a hypervisor, of said physical processor among said plurality of logical partitions;
    allocating, by said hypervisor, said service window to each one of said logical partitions during each dispatch time slice;
    dynamically determining, by a kernel process, during runtime whether a length of said first service window should be increased; and
    in response to determining that said length should be increased, dynamically increasing, utilizing said hypervisor, said length of said first service window during runtime to optimize interrupt processing and reduce interrupt latency.

3. The method according to claim 1, further comprising,
    updating, by said kernel process, statistics that are maintained by said kernel process for said first one of said plurality of logical partitions;
    determining whether a threshold has been exceeded for said severity level errors; and
    in response to determining that said threshold has been exceeded, dynamically determining that said length should be increased.

4. The method according to claim 3, further comprising,
    requesting, by said kernel notification process, an increase in said length of said first service window.

5. The method according to claim 3, further comprising:
    requesting, by said kernel notification process, a hypervisor to increase said length of said first service window;
    determining, by said hypervisor, during runtime whether said length can be increased; and
    in response to determining that said length can be increased, increasing, by said hypervisor, said length.

6. The method according to claim 1, further comprising:
    repeatedly self-tuning said length during runtime by firmware being executed in said system until said length is optimized.

7. An apparatus in a shared processor data processing system for dynamically tuning an amount of physical processor capacity that is allocated to each one of a plurality of logical partitions to optimize interrupt processing and reduce interrupt latency, said apparatus comprising:
    a physical processor shared among said plurality of logical partitions;
    a separate service window allocated to each one of said logical partitions during each dispatch time slice;
    said physical processor executing processes defined by a first one of said plurality of logical partitions during a first service window that was allocated to said first one of said plurality of logical partitions;
    firmware dynamically determining during runtime whether to increase a length of said first service window;
    in response to determining that said length should be increased, said firmware dynamically increasing said length of said first service window during runtime to optimize interrupt processing and reduce interrupt latency, said first one of said plurality of logical partitions being granted additional processing capacity of said physical processor;
    an input/output (I/O) device generating an interrupt for said first one of said plurality of logical partitions;

a device driver interrupt handler analyzing said I/O device to determine whether a latency-induced error has occurred in said I/O device;

in response to determining that a latency-induced error has occurred in said I/O device, said device driver interrupt handler assigning a severity level to said error; and said device driver interrupt handler notifying a kernel process that said latency-induced error occurred and including said severity level in said notification.

8. The apparatus according to claim 7, further comprising:

said firmware managing sharing of said physical processor among said plurality of logical partitions;

said firmware allocating a separate service window to each one of said logical partitions during each dispatch time slice;

a kernel process dynamically determining during runtime whether to request an increase in said length of said first service window; and in response to determining that said length should be increased, said firmware dynamically increasing said length of said first service window during runtime to optimize interrupt processing and reduce interrupt latency.

9. The apparatus according to claim, further comprising:

said kernel process updating statistics that are maintained by said kernel process for said first one of said plurality of logical partitions;

said kernel process determining whether a threshold has been exceeded for said severity level errors; and in response to determining that said threshold has been exceeded, said kernel process dynamically determining that said length should be increased.

10. The apparatus according to claim 9, further comprising, said kernel process requesting an increase in said length of said first service window.

11. The apparatus according to claim 9, further comprising:

said kernel notification process requesting said firmware to increase said length of said first service window;

said firmware determining during runtime whether said length can be increased; and in response to determining that said length can be increased, said firmware increasing said length.

12. The apparatus according to claim 7, further comprising:

said firmware repeatedly self-tuning said length during runtime until said length is optimized.

13. A computer program product for dynamically tuning an amount of physical processor capacity that is allocated to each one of a plurality of logical partitions to optimize interrupt processing and reduce interrupt latency, said method comprising:

instructions for sharing a physical processor among said plurality of logical partitions;

instructions for allocating a service window to each one of said logical partitions during each dispatch time slice;

instructions for executing, by said physical processor, processes defined by a first one of said plurality of logical partitions during a first service window that was allocated to said first one of said plurality of logical partitions;

instructions for dynamically determining during runtime whether a length of said first service window should be increased;

in response to determining that said length should be increased, instructions for dynamically increasing said length of said first service window during runtime to optimize interrupt processing and reduce interrupt latency, said first one of said plurality of logical partitions being granted additional processing capacity of said physical processor;

said instructions for dynamically determining during runtime whether said length of said first service window should be increased further includes:

instructions for generating, by an input/output (I/O) device, an interrupt for said first one of said plurality of logical partitions;

instructions for analyzing said I/O device to determine whether a latency-induced error has occurred in said I/O device;

in response to determining that a latency-induced error has occurred in said I/O device, instructions for assigning a severity level to said error; and instructions for notifying a kernel process that said latency-induced error occurred and including said severity level in said notification.

14. The product according to claim 13, further comprising:

instructions for managing sharing, utilizing a hypervisor, of said physical processor among said plurality of logical partitions;

instructions for allocating, by said hypervisor, said service window to each one of said logical partitions during each dispatch time slice;

instructions for dynamically determining, by a kernel process, during runtime whether a length of said first service window should be increased; and in response to determining that said length should be increased, instructions for dynamically increasing, utilizing said hypervisor, said length of said first service window during runtime to optimize interrupt processing and reduce interrupt latency.

15. The product according to claim 13, further comprising:

instructions for updating, by said kernel process, statistics that are maintained by said kernel process for said first one of said plurality of logical partitions;

instructions for determining whether a threshold has been exceeded for said severity level errors; and in response to determining that said threshold has been exceeded, instructions for dynamically determining that said length should be increased.

16. The product according to claim 13, further comprising:

instructions for requesting, by said kernel notification process, a hypervisor to increase said length of said first service window;

instructions for determining, by said hypervisor, during runtime whether said length can be increased; and in response to determining that said length can be increased, instructions for increasing, by said hypervisor, said length.

17. The product according to claim 13, further comprising:

instructions for repeatedly self-tuning said length during runtime by firmware being executed in said system until said length is optimized.

* * * * *